United States Patent

Bonne et al.

[11] Patent Number: 5,874,381
[45] Date of Patent: Feb. 23, 1999

[54] COBALT ON ALUMINA CATALYSTS

[75] Inventors: Raimond Laurentius Bonne; Cornelis Martinus Lok, both of Wirral, United Kingdom

[73] Assignee: Crosfield Limited, Warrington, United Kingdom

[21] Appl. No.: 776,570

[22] PCT Filed: Jul. 17, 1995

[86] PCT No.: PCT/EP95/02836

§ 371 Date: Apr. 8, 1997

§ 102(e) Date: Apr. 8, 1997

[87] PCT Pub. No.: WO96/04072

PCT Pub. Date: Feb. 15, 1996

[30] Foreign Application Priority Data

Aug. 2, 1994 [GB] United Kingdom .................. 9415554

[51] Int. Cl.$^6$ .............................. B01J 23/38; B01J 23/40
[52] U.S. Cl. .......................... 502/327; 502/326; 502/355
[58] Field of Search ..................................... 502/326, 327, 502/355

[56] References Cited

U.S. PATENT DOCUMENTS

| | | | |
|---|---|---|---|
| 3,883,444 | 5/1975 | Maselli et al. ...................... | 423/213.2 |
| 4,237,030 | 12/1980 | Noguchi et al. ....................... | 502/207 |
| 4,448,896 | 5/1984 | Kageyama et al. ..................... | 502/314 |
| 4,602,000 | 7/1986 | Dupin et al. ........................... | 502/335 |
| 4,665,048 | 5/1987 | Van Leenwen et al. ................ | 502/221 |
| 4,788,174 | 11/1988 | Arai ........................................ | 502/324 |
| 4,927,857 | 5/1990 | McShea, III et al. .................. | 518/703 |
| 5,268,091 | 12/1993 | Boitiaux et al. ..................... | 208/251 R |
| 5,358,633 | 10/1994 | Dai et al. ............................. | 208/216 R |

FOREIGN PATENT DOCUMENTS

| | | | |
|---|---|---|---|
| 013 275 | 7/1980 | European Pat. Off. ......... | B01J 23/74 |
| 029 675 | 6/1981 | European Pat. Off. ......... | B01J 23/74 |
| 145 094 | 6/1985 | European Pat. Off. ......... | B01J 23/74 |

OTHER PUBLICATIONS

Database WPI, Section CH, Week 9315, Derwent Publications Ltd., London, GB; Class E12, AN 93–124391 & SU,A,728 222–Apr. 23, 1992, see abstract.

Primary Examiner—Elizabeth D. Wood
Attorney, Agent, or Firm—Pillsbury Madison & Sutro LLP

[57] ABSTRACT

A cobalt on transition alumina catalyst, containing between 3 and 40% by weight of cobalt has a cobalt surface area above 30 $m^2/_g$ of cobalt, preferably above 50 $m^2/_g$ of cobalt, most preferably above 80 $m^2/_g$ of cobalt.

13 Claims, No Drawings

COBALT ON ALUMINA CATALYSTS

This application is the national phase of international application PCT/EP95/02836, filed Jul. 17, 1995 which designated the U.S.

FIELD OF THE INVENTION

The present invention relates to cobalt on alumina catalysts and to a process for making the same.

BACKGROUND OF THE INVENTION

In catalysts, cobalt is normally fixed on a carrier such as silica, aluminium silicate, alumina.

In these catalysts, the useful cobalt atoms are those which are exposed at the surface of the cobalt particles. The cobalt atoms which are not exposed (i.e not at the surface) will not participate in catalytic reaction.

Cobalt is an expensive metal and, in order to optimize its use as a catalyst, it is essential to increase as much as possible the (number of exposed cobalt atoms/ total number of cobalt atoms) ratio of the catalyst which, in turn, increases the cobalt surface area per gram of cobalt.

It is known from EP-A-13,275 to produce a supported coprecipitated cobalt-silica catalyst wherein a reaction mixture of cobalt ions, silicate ions and solid porous carrier particles is prepared and allowed to form a coprecipitate of cobalt and silicate ions onto the solid porous support particles. The obtained cobalt-silica catalyst has a BET total surface area ranging from 150 to 350 $m^2/g$ and a cobalt surface area ranging from 5 to 20 $m^2/g$ of cobalt.

It is also known from U.S. Pat. No. 4,591,579 to provide a process for the preparation of a transition metal-silicate catalyst in which an insoluble, basic compound of a transition metal (e.g. cobalt, nickel or copper) is precipitated with an alkaline precipitation agent from an aqueous solution of such a metal salt after which this compound is reacted with a silicate solution. In example 5, it is described such a catalyst wherein the cobalt surface area is 8.9 $m^2/g$ of catalyst.

In 'Stoichiometries of $H_2$ and CO Adsorptions on cobalt'—Journal of Catalysis 85, page 63–77 (1984)—are disclosed on page 67, table 1, cobalt catalysts on different carriers. From the total maximum $H_2$ uptake, it is possible to calculate the cobalt surface area per gram of catalyst and the cobalt surface area per gram of cobalt. It can be seen that, for cobalt on silica catalysts the cobalt surface area per gram of cobalt ranges between 6 and 65 $m^2/g$ whereas for cobalt on transition alumina catalysts the cobalt surface area per gram of cobalt ranges between 15 and 26 $m^2/g$.

Thus, cobalt catalysts with a high cobalt surface area per gram of cobalt exist for cobalt on silica catalysts (and also for cobalt on carbon catalysts), but don't exist for cobalt on transition alumina catalysts.

Nevertheless, cobalt upon transition alumina catalysts present some distinct advantages towards other cobalt catalysts.

First of all, a cobalt on transition alumina catalyst is easier to shape by extrusion than a cobalt on silica catalyst and the mechanical strength of the resulting catalyst is higher.

In reactions where water is present (e.g. methanation, Fisher Tropsch), silica can be unstable. Alumina, however, is much more stable under such conditions.

There is therefore a need for a cobalt on transition alumina catalyst with a cobalt surface area per gram of cobalt higher than previously obtained.

Its is a first goal of the present invention to provide a cobalt on transition alumina catalyst with a cobalt surface area per gram of cobalt higher than previously.

It is a second goal of the present invention to provide a process for manufacturing such catalyst.

Tests and Definitions i) cobalt surface area

Approximately 0.5 g of sample is used for the analysis. The weight used to calculate the metallic surface area is that obtained after pretreatment. During this pretreatment the sample is degassed and dried under vacuum at 120° C. The pretreated sample is then reduced. Sample is heated to 425° C. at a rate of 3° C./min whilst hydrogen gas is passed through the sample at a flow rate of 250 ml/min. Still with the same hydrogen flow the sample is maintained at 425° C. for 18 hours. Under vacuum the sample is heated up to 450° C. over a 10 min time period. The sample is maintained at 450° C. under vacuum for 2 hours.

The chemisorption analysis is carried out at 150° C. using pure hydrogen gas. An automatic analysis program is used to measure a full isotherm up to 800 mmHg pressure of hydrogen.

The method is to extrapolate the straight-line portion of the chemisorption isotherm between 300 and 800 mmHg to zero pressure to calculate the volume of gas chemisorbed (V).

Metallic surface areas were calculated in all cases using the following equation, $$Met.\ S.A. = \frac{6.023 \times 10^{23} \times V \times SF \times A}{22414}$$

Where V=uptake of hydrogen in ml/g SF=Stoichiometry factor (assumed to be 2 for $H_2$ chemisorption on Co) A=area occupied by one atom of cobalt (assumed to be 0.0662 $nm^2$)

This equation is disclosed by Micromeretics in Operators Manual for ASAP 2000 Chemi System V 1.00, Appendix C, Part No. 200-42808-01, 18 January 1991.

ii) Transition alumina

Transition aluminas are defined in "Ullmans Encyklopaedie der technischen Chemie", 4., neubearbeitete und erweiterte Auflage, Band 7 (1974), pp.298–299.

The document divides transition aluminas in several categories:

-gamma-group

Included in the gamma-group are, apart from gamma-Al2O3, all low-temperature forms such as eta-Al2O3 and chi-Al2O3. They are formed on calcination of aluminiumhydroxides at 400°–750° C.

The specific surface area of gamma-group forms of aluminas is in the range of 150–400 $m^2/g$.

delta-group

The delta group of aluminas includes all high-temperature forms, e.g. delta-, theta- and chi-Al2O3. The delta group aluminas are formed on heating gamma-group aluminas at approximately 800° C. or higher.

The specific surface area of delta-group forms of aluminas is in the range of 50–150 $m^2/g$.

General Description of the Invention

It is a first object of the present invention to provide a cobalt, on transition alumina support, catalyst, containing between 3 and 40% by weight-of cobalt wherein the cobalt surface area is above 30 m$^2$/g of cobalt, preferably above 40 m$^2$/g, more preferably above 50 m$^2$/g of cobalt, even more preferably above 80 m$^2$/g of cobalt.

Preferably, the transition alumina support is a gamma alumina or a theta alumina, more preferably a theta alumina.

Preferably, the cobalt catalyst contains 5% to 20% by weight of cobalt, more preferably 10 to 20 % by weight.

It is a second object of the present invention to provide a process for manufacturing a cobalt, on transition alumina support, catalyst, containing between 3 and 40% by weight of cobalt, the cobalt surface area being above 30 m$^2$/g of cobalt, wherein a slurry of transition alumina in an aqueous solution of cobalt ammine carbonate is heated to a temperature of 60° C. to 110° C., in order to allow cobalt hydroxycarbonate to precipitate, the resulting product being then dried and calcined. Optionally, the calcined product may be further reduced.

Preferably, the transition alumina support is a gamma alumina or a theta alumina, more preferably a theta alumina.

It is a third object of the present invention to provide a process for manufacturing a cobalt, on transition alumina support, catalyst, containing between 3 and 40% by weight of cobalt, the cobalt surface area being above 30 m$^2$/g of cobalt, wherein, transition alumina particles are saturated with an aqueous solution of cobalt ammine carbonate, the excess solution being removed by filtration, the resulting product being heated to a temperature of 60° C. to 110° C. , in order to allow cobalt hydroxycarbonate to precipitate, the resulting product being then dried and calcined.

Preferably, the transition alumina support is a gamma alumina or a theta alumina, more preferably a theta alumina.

Successive impregnation and precipitation steps may be applied to increase the cobalt content, the deposited cobalt hydroxycarbonate being converted into cobalt oxides during a calcination treatment at a temperature of 200° to 600° C.

The product can then be activated with hydrogen gas at temperatures between 200° and 600° C. preferably between 350° and 550° C. and then optionally passivated Specific Description of the Invention The present invention will be further described in the following examples.

EXAMPLE 1 i) Preparation of the impregnation solution.

Weigh out 1764.0 g of a 35% ammonium hydroxide solution (specific gravity 0.88) (obtainable from BDH) and add 73.5 g of demineralised water. Add 312.5 g of ammonium carbonate (obtainable from Merck) and start stirring. Heat gently to 35° C. to assist dissolving the powder. When fully dissolved, add slowly 350 g of basic cobalt carbonate (obtainable from Merck and containing 47–55 wt % Co). Continue stirring for about 2 hours. Filter through Buchner funnel.

ii) Impregnation of 8-Al$_2$O$_3$ support

Weigh out 100 g of theta alumina into a beaker and add 0.5 l of the impregnation solution. After 10 minutes put the impregnated extrudates on a Buchner filter to drain excess liquid. Then dry the product for 1 hour at room temperature then 1 hour at 80° C. and finally overnight (16h) at 120° C. Eventually, the dried product is calcined in an air flow at 350° C. for 2 hours using a rotary calciner.

EXAMPLE 2

The dried product obtained in Example 1, after impregnation and before calcination is impregnated once again as disclosed in Example 1, under ii) and dried as disclosed in Example 1 under ii).

Eventually, the dried product is calcined in an air flow at 350° C. for 2 hours using a rotary calciner.

EXAMPLE 3

The dried product obtained in Example 2, after impregnation and before calcination is impregnated once again as disclosed in Example 1, under ii) and dried as disclosed in Example 1 under ii).

Eventually, the dried product is calcined in an air flow at 350° C. for 2 hours using a rotary calciner.

EXAMPLE 4

The dried product obtained in Example 3, after impregnation and before calcination is impregnated once again as disclosed in Example 1, under ii) and dried as disclosed in Example 1 under ii). Eventually, the dried product is calcined in an air flow at 350° C. for 2 hours using a rotary calciner.

The products obtained in Examples 1 to 4 were then analysed and the results are as follows:

|  | Ex. 1 | Ex. 2 | Ex. 3 | Ex. 4 |
| --- | --- | --- | --- | --- |
| Co (w/w %) | 5.9 | 9.5 | 11.7 | 13.2 |
| Surface area (m$^2$/g of cobalt) | 55.9 | 91.6 | 98.3 | 101.5 |
| Surface area (m$^2$/g of catalyst) | 3.3 | 8.7 | 11.5 | 13.4 |

It can be seen that cobalt on alumina support catalysts with a very high cobalt surface area (per gram of cobalt) can be obtained which enables to have cobalt surface areas (per gram of catalyst) comparable with those obtained in the prior art but with a much lower cobalt content.

A catalyst according to example 3, after having been activated, was tested for its catalytic activity in the hydrogenation of aromatics, using toluene as a probe.

Reaction conditions: Pressure: 40 bar H$_2$ LHSV: 3 Hydrogen flow: 15 ml/min Temperature: 200° C. Catalyst loading: 6 ml (i.e 5 g)

The conversion of toluene into hydrogenated products was 62% proving that the product of the present invention can be used as an hydrogenation catalyst.

We claim:

1. A catalyst, comprising cobalt on a support of transition alumina, having a cobalt content between 3 and 40% by weight, and which, when reduced with hydrogen at 425° C., has a cobalt metal surface area above 30 m$^2$ per g of cobalt.

2. A catalyst according to claim 1, wherein said cobalt metal surface area is above 40 m$^2$ per g of cobalt.

3. A catalyst according to claim 1, wherein said cobalt metal surface area is above 50 m$^2$ per g of cobalt.

4. A catalyst according to claim 1, wherein said cobalt metal surface area is above 80 m$^2$ per g of cobalt.

5. A catalyst according to claim 1, wherein the support is theta alumina.

6. A catalyst according to claim 1, wherein said catalyst has a cobalt content between 5 and 20% by weight.

7. A catalyst according to claim 1, wherein said catalyst is in the reduced state.

8. A process for manufacturing a catalyst of cobalt on a support of transition alumina and having a cobalt content between 3 and 40% by weight, and, when reduced with hydrogen at 425° C., has a cobalt metal surface area above 30 m$^2$ per g of cobalt, said process comprising heating a mixture of transition alumina and an aqueous solution of cobalt amine carbonate to a temperature of 60° C. to 110° C. in order to allow cobalt hydroxycarbonate to precipitate, drying and calcining the resulting product at a temperature below 60° C.

9. A process according to claim 8, wherein said transition alumina is a theta alumina.

10. A process according to claim 8, further comprising saturating transition alumina particles with an aqueous solution of cobalt amine carbonate, and removing the excess of the solution before heating the resulting product to a temperature of 60° C. to 110° C.

11. A process according to claim 10, wherein said transition alumina is a theta alumina.

12. A process according to claim 8, wherein the transition alumina is in the form of extrudates.

13. A process according to claim 8, further comprising the step of reducing the calcined product.

* * * * *

UNITED STATES PATENT AND TRADEMARK OFFICE
CERTIFICATE OF CORRECTION

PATENT NO. :5,874,381
DATED :February 23, 1999
INVENTOR(s) :BONNE ET AL

It is certified that error appears in the above-identified patent and that said Letters Patent is hereby corrected as shown below:

Claim 8, Column 5, line 4, change "60°C" to "600°C".

Signed and Sealed this

Seventeenth Day of April, 2001

Attest:

NICHOLAS P. GODICI

Attesting Officer

Acting Director of the United States Patent and Trademark Office